United States Patent
Brockman et al.

(10) Patent No.: US 6,529,594 B1
(45) Date of Patent: *Mar. 4, 2003

(54) SYSTEM AND METHOD FOR GENERATING QUALITY OF SERVICE STATISTICS FOR AN INTERNATIONAL COMMUNICATIONS NETWORK

(75) Inventors: Pierce Edward Brockman, Garland, TX (US); Timothy K. Patterson, Allen, TX (US); Guarang S. Kalyanpur, Allen, TX (US)

(73) Assignee: Inet Technologies, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/092,256

(22) Filed: Jun. 5, 1998

(51) Int. Cl.[7] .......................... H04M 15/00; H04M 1/24
(52) U.S. Cl. ................. 379/133; 379/134; 379/112.06; 379/114.01; 379/115.01; 379/32.01
(58) Field of Search .......................... 379/32.01, 32.02, 379/32.03, 111, 112.01, 112.05, 114.01, 133, 134, 219, 32.05, 112.06, 112.07, 112.08, 115.01, 114.28, 115.03

(56) References Cited

U.S. PATENT DOCUMENTS

| | | | |
|---|---|---|---|
| 5,008,929 A | 4/1991 | Olsen et al. ................. | 379/112 |
| 5,333,183 A | 7/1994 | Herbert ....................... | 379/112 |
| 5,426,688 A | 6/1995 | Anand ............................ | 379/5 |
| 5,438,570 A | 8/1995 | Karras | |
| 5,448,624 A | 9/1995 | Hardy et al. .................... | 379/67 |
| 5,457,729 A | 10/1995 | Hamann et al. ................ | 379/2 |
| 5,473,596 A | 12/1995 | Garafola et al. ............... | 370/13 |
| 5,475,732 A | 12/1995 | Pester, III ..................... | 379/34 |
| 5,488,648 A | 1/1996 | Womble ....................... | 375/13 |
| 5,521,902 A | 5/1996 | Ferguson ...................... | 370/13 |
| 5,539,804 A | 7/1996 | Hong et al. .................... | 379/33 |

(List continued on next page.)

FOREIGN PATENT DOCUMENTS

| | | | |
|---|---|---|---|
| EP | 0 541 145 A1 | 10/1992 | |
| EP | 0 841 831 A2 | 5/1998 | |
| EP | 0 905 565 A1 | 8/1998 | |
| WO | WO 95/33352 | 12/1995 | |
| WO | WO 97/05749 A3 | 2/1997 | |
| WO | WO 97/05749 A2 | 2/1997 | |
| WO | WO 97/16916 A1 | 5/1997 | |
| WO | WO 97/22212 A1 | 6/1997 | |
| WO | WO 97/23078 A1 | 6/1997 | |
| WO | WO 97/38551 A3 | 10/1997 | |
| WO | WO 97/38551 A2 | 10/1997 | |
| WO | WO 98/28879 A1 | 7/1998 | |
| WO | WO98/47275 | 10/1998 | ............ H04M/7/00 |
| WO | WO 98/47275 A2 | 10/1998 | |
| WO | WO 98/47298 | 10/1998 | |
| WO | WO 99/09705 A3 | 2/1999 | |
| WO | WO 99/09705 A2 | 2/1999 | |

OTHER PUBLICATIONS

Schoen U. et al. "Convergence Between Public Switching and The Internet", ISS World Telecommunications Congress, CA, Toronto, Pinnacle Group, Sep. 21, 1997, pp. 549–560.

(List continued on next page.)

*Primary Examiner*—Duc Nguyen
*Assistant Examiner*—Quoc Duc Tran
(74) *Attorney, Agent, or Firm*—Fulbright & Jaworski L.L.P.

(57) ABSTRACT

A system and method for capturing signaling units at international gateways in a communications network is disclosed. The signaling units are processed to determine the source and destination networks for the associated calls. The country code, nature of address field, destination point code and origination point code is used to process each message. Data about the messages that pass through the international gateway is stored to a memory device. The data can be recalled for each originating or destination network in the form of performance or quality of service statistics.

16 Claims, 2 Drawing Sheets

U.S. PATENT DOCUMENTS

| | | | | |
|---|---|---|---|---|
| 5,550,903 A | * | 8/1996 | Chang | 379/115.01 |
| 5,550,914 A | | 8/1996 | Clarke et al. | 379/230 |
| 5,550,984 A | | 8/1996 | Gelb | 395/200.17 |
| 5,579,371 A | | 11/1996 | Aridas et al. | 379/34 |
| 5,590,171 A | | 12/1996 | Howe et al. | 379/33 |
| 5,592,530 A | | 1/1997 | Brockman et al. | 379/34 |
| 5,642,396 A | | 6/1997 | Cowgill | |
| 5,659,542 A | | 8/1997 | Bell et al. | |
| 5,675,635 A | | 10/1997 | Vos et al. | |
| 5,680,437 A | | 10/1997 | Segal | 379/10 |
| 5,680,442 A | | 10/1997 | Bartholomew et al. | 379/67 |
| 5,694,451 A | | 12/1997 | Arinell | 379/34 |
| 5,699,348 A | | 12/1997 | Baidon et al. | |
| 5,699,412 A | | 12/1997 | Polcyn | 379/89 |
| 5,703,939 A | | 12/1997 | Bushnell | 379/113 |
| 5,706,286 A | | 1/1998 | Reiman et al. | 370/401 |
| 5,712,908 A | | 1/1998 | Brinkman | |
| 5,715,293 A | | 2/1998 | Mahoney | |
| 5,719,930 A | | 2/1998 | MacDonald et al. | |
| 5,729,597 A | | 3/1998 | Bhusri | 379/115 |
| 5,737,332 A | | 4/1998 | Corrigan et al. | |
| 5,737,399 A | | 4/1998 | Witzman et al. | 379/112 |
| 5,757,895 A | | 5/1998 | Airdas et al. | 379/136 |
| 5,771,274 A | | 6/1998 | Harris | |
| 5,793,771 A | | 8/1998 | Darland et al. | 370/467 |
| 5,799,073 A | | 8/1998 | Fleischer, III et al. | 379/113 |
| 5,802,303 A | | 9/1998 | Yamaguchi | |
| 5,822,401 A | | 10/1998 | Cave et al. | 379/34 |
| 5,825,769 A | | 10/1998 | O'Reilly et al. | 370/360 |
| 5,828,729 A | | 10/1998 | Clermont et al. | 379/34 |
| 5,845,211 A | | 12/1998 | Roach, Jr. | |
| 5,854,824 A | | 12/1998 | Bengal et al. | 379/34 |
| 5,854,835 A | | 12/1998 | Montgomery et al. | 379/119 |
| 5,864,608 A | * | 1/1999 | Brownmiller et al. | 379/133 |
| 5,867,558 A | | 2/1999 | Swanson | 379/34 |
| 5,870,565 A | | 2/1999 | Glitho | |
| 5,875,238 A | | 2/1999 | Glitho et al. | 375/116 |
| 5,881,132 A | | 3/1999 | O'Brien et al. | 379/35 |
| 5,883,948 A | | 3/1999 | Dunn | 379/210 |
| 5,884,175 A | | 3/1999 | Schiefer et al. | |
| 5,892,812 A | | 4/1999 | Pester | 379/34 |
| 5,896,292 A | | 4/1999 | Hosaka et al. | |
| 5,898,667 A | | 4/1999 | Longfield et al. | |
| 5,912,954 A | | 6/1999 | Whited et al. | 379/115 |
| 5,920,257 A | | 7/1999 | Commerford | |
| 5,920,613 A | | 7/1999 | Alcott et al. | 379/114 |
| 5,937,345 A | | 8/1999 | McGowan et al. | |
| 5,999,179 A | | 12/1999 | Kekic et al. | |
| 5,999,604 A | | 12/1999 | Walter | |
| 6,021,117 A | | 2/2000 | Juniper et al. | |
| 6,028,914 A | | 2/2000 | Lin et al. | 379/14 |
| 6,041,352 A | | 3/2000 | Burdick et al. | |
| 6,072,797 A | | 6/2000 | Fletcher | |
| 6,078,647 A | | 6/2000 | D'Eletto | |
| 6,081,715 A | | 6/2000 | La Porta et al. | |
| 6,112,083 A | | 8/2000 | Sweet et al. | |
| 6,118,936 A | | 9/2000 | Lauer et al. | |
| 6,119,000 A | | 9/2000 | Stephenson et al. | |
| 6,249,572 B1 | | 6/2001 | Brockman et al. | |
| 6,253,266 B1 | | 6/2001 | Ohanian | |
| 6,282,267 B1 | * | 8/2001 | Nolting | 379/34 |
| 6,359,976 B1 | * | 3/2002 | Kalyanpur et al. | 379/134 |
| 6,381,306 B1 | * | 4/2002 | Lawson et al. | 379/32.01 |
| 6,411,604 B1 | * | 6/2002 | Brockman et al. | 370/244 |

OTHER PUBLICATIONS

Geiger, Robert L. et al., "Wireless Network Extension Using Mobile IP," XP000628459, Motorola, Inc. Feb. 25, 1996, pp. 9–14.

IEEE Standard Core Specs for Microcomputers–June 18, 1992.

IEEE Standard for Metric Equipment Jan. 09, 1992.

Intelligent Remote Monitoring Oct. 16, 1995.

* cited by examiner

_SYSTEM AND METHOD FOR GENERATING QUALITY OF SERVICE STATISTICS FOR AN INTERNATIONAL COMMUNICATIONS NETWORK_

RELATED APPLICATIONS

The present invention is related to pending applications assigned Ser. No. 09/062,428 entitled SYSTEM AND METHOD FOR MASS CALL ONSET DETECTION IN A COMMUNICATIONS NETWORK; 09/092,699 entitled SYSTEM AND METHOD FOR SIGNAL UNIT DATA STORAGE AND POST CAPTURE CALL TRACE IN A COMMUNICATIONS NETWORK; and 09/092,771 entitled SYSTEM AND METHOD FOR CORRELATING TRANSACTION MESSAGES IN A COMMUNICATIONS NETWORK, filed concurrently with this application and hereby incorporated by reference herein. These applications are commonly assigned.

TECHNICAL FIELD OF THE INVENTION

The present invention is related to monitoring international calls in a communications network, and, more particularly, to monitoring messages for international calls in between two or more national telecommunications networks.

BACKGROUND OF THE INVENTION

Common channel signaling networks, such as the Signaling System Seven (SS7) based signal system, use dedicated channels to pass digital messages between systems for call setup, call control, call routing, and other functions. These dedicated signaling channels are part of a network that is separate from the network that carries the actual voice and data signals. An SS7 network is a separate switching system which is used prior to, during, and at the end of an actual voice or data call. The SS7 network is used to route control information. Whenever two switches or elements have to pass call control information during or prior to a phone call, they pass this data via the SS7 signaling network.

There are three basic types of network node elements in an SS7 network. One of them is the Service Switching Point (SSP), which may be a central office switch, a tandem switch or an end office switch. A second principal node element is the Service Control Point (SCP). An SCP acts as a database query server for the rest of the network. An SCP is used in such applications as translating ported telephone numbers, routing 800 calls, tracking roamers in a cellular network, and Alternate Billing Service/Line Identification Database services (or ABS/LIDB) which provide operator-type services. The third principal node element is the Signal Transfer point (STP). An STP is essentially a packet switch that routes the messages from SSPs and SCPs to SSPs and SCPs.

It is possible to combine these three different types of nodes into a single node. However, in North America, they are typically not combined. An SSP performs only switch functions, an SCP only control functions, and an STP only signal transfer functions. In European telecommunications systems, all of these different functions may be combined into one node.

The SS7 network carries a great deal of information and is extremely critical to the operation of the phone system. If an SS7 network is not functioning, or if portions of it are not operating, the phone system simply cannot deliver phone calls, even though all of the voice circuits are operating properly. The capacity and complexity of the SS7 network is small in terms of circuitry and bandwidth utilized by an end user compared to previous voice and data networks. The circuitry of the SS7 network is therefore much more critical. The actual elements in the SS7 network do not provide all the information required in network operations to manage and to determine the health and state of an SS7 network. It is therefore necessary for the telephone industry to deploy surveillance equipment to monitor the links connecting the nodes of the SS7 network.

The topology of the network is such that STPs are typically deployed in a mated pair configuration at geographically separate locations. Connected to a mated pair of STPs will be a set of SSPs and SCPs. This conglomeration of SSPs, SCPs and mated Pair STPs is called a cluster. Clusters are then connected by D-Quad links between STP mated pairs.

When any transaction or message is sent between two different devices on the network, it is often the case that the messages going from switch A to switch B travel one route on the network while the messages going from switch B to switch A travel a different route. The network surveillance equipment that monitors the link is designed to capture and correlate as much signaling information as possible regardless of network activity. Because of the different data paths that messages may take, it is difficult to do this correlation above what is called the transport layer when monitoring links at the STP sites. An example of an application level problem would be where a subscriber has a problem getting his/her calls delivered. The telephone company may attempt to fix the problem by doing a trace of all data pertaining to that subscriber's phone number, but the data may not all be located at one point. The data may be all in one STP, or split in some fashion, partially in one STP and partially in the other STP of a mated pair, which may be in a different city many miles away.

SUMMARY OF THE INVENTION

These and other objects, features and technical advantages are achieved by a system and method in which one or more monitoring units capture signaling units from links in a communications network. The monitoring units have processors for running applications that are used to process the captured signaling units. In the present invention, one or more monitoring units are coupled to the lines of an international gateway between two national communications networks. The monitoring units capture messages for international calls and identify the source and destination network for each calls. The success or failure of each call is monitored along with cause of call release.

The monitoring units are coupled to a server which maintains data for processing the international call messages, such as a table mapping point codes to country codes. The system is capable of determining whether a call is a national call, an international call or a transit call. The system stores data regarding the captured signaling units in a memory device. Users can recall data from the memory device to generate quality of service statistics for networks coupled to the international gateway.

The system uses the called party country code, Nature of Address field and point codes in the signaling units to determine the origin and destination of each message.

Automated monitoring equipment that continually monitors, in real time, the delivery of all calls over the signaling network is disclosed in U.S. Pat. No. 5,592,530, entitled TELEPHONE SWITCH DUAL MONITORS; and in U.S. Pat. No. 6,028,914, entitled SYSTEM AND METHOD FOR MONITORING PERFORMANCE STATISTICS IN A COMMUNICATIONS NETWORK, the disclosure of which is hereby incorporated by reference herein. These references and the present application are commonly assigned.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
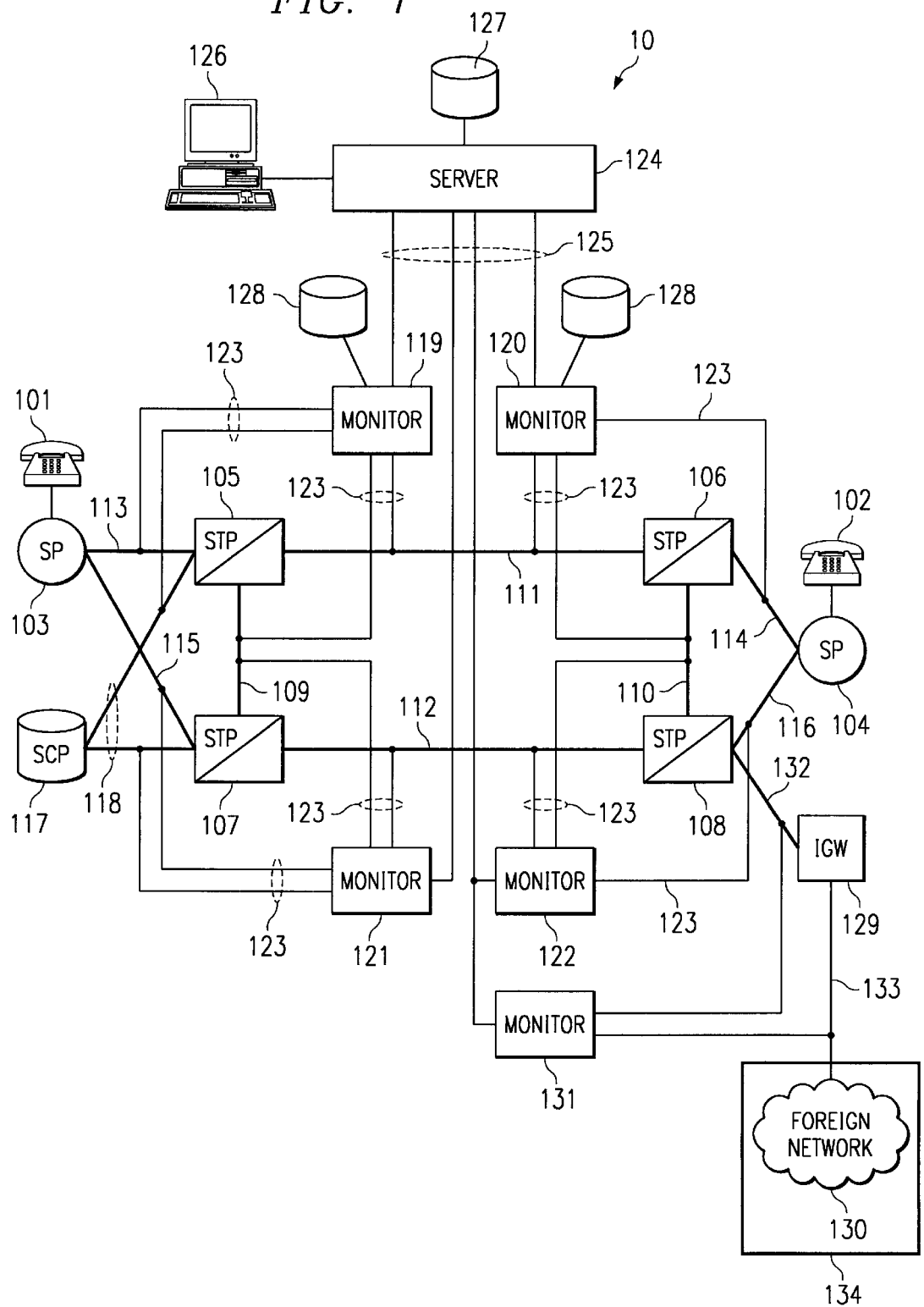
FIG. 1 is a block diagram of a system incorporating the present invention.

FIG. 1 is a block diagram of communications network 10 in which telephones 101 and 102 communicate via a signaling network, such as an SS7 network. It will be understood that telephones 101, 102 are used for illustration purposes only and that any voice or data communications device may be connected to the network. In the embodiment illustrated in FIG. 1, telephones 101 and 102 are connected to end offices 103 and 104, which may be Signaling Points (SP), as shown, or SSPs. End offices 103 and 104 are linked to each other through a signaling network comprised of STPs 105–108, which are connected via links 109–112. SPs 103 and 104 are connected to STPs 105–108 via links 113–116. Calls, transactions and other signals or messages between end office 103 and end office 104 may take any of a number of paths across links 109–116 and through STPs 105–108.

Typically, a series of signals that are related to one call or transaction will traverse across the same path through network 10 from one end office to another. For example, for a particular transaction, all signaling units sent from SP 103 may cross links 113, 111, and 114 through STPs 105 and 106. However, network problems or system failures may cause different signals for the same transaction to take different paths. It is also typical that signals traversing the system in the reverse direction may use a different path through the network. For example, for the same transaction illustrated above, signals from SP 104 may traverse links 116, 112, and 115 through STPs 108 and 107. Therefore, a single link or network element may not see all the messages or signals for one complete transaction or call.

In certain circumstances, such as for an 800 number call or for a call to an exchange or number that has been ported to a different switch, message may be sent to SCP 117 to perform various database look-up functions. Signals or messages are exchanged with SCP 117 via links 118. In other embodiments, there may be additional components in network 10, such as Service Nodes (SN) or Intelligent Peripherals (IP), which would require additional signal paths.

In network 10, monitors 119–122 are individually paired with STPs 105–108. Each monitor 119–122 is coupled to every link for a particular STP by connections 123, which may be embodied as a branch or tee off of links 109–116. This allows monitors 119–122 to capture or detect every signaling unit that is sent to, or from, each STP 105–108. As described in U.S. Pat. No. 5,592,530 and application Ser. No. 09/057,940, monitors 119–122 are coupled via an inter-monitor communications link (not shown) which allows monitors 119–122 to transfer captured signaling units and messages among themselves. Typically, the first monitor to detect a signaling unit for a call or transaction is designated as a controlling or anchor monitor. The other monitors then send any later detected signaling units for the same transaction or call to the anchor monitor. The anchor monitors correlates all of the messages from a particular transaction or call into a single record. Usually, each signaling unit is identified as belonging to a particular transaction by the Transaction Identifier (TID).

Monitors 119–122 are connected to server 124 via connection 125, which may be a Wide Area Network (WAN) or any other data network connection. Once a call or transaction record is complete, the record is then sent to server 124 for further processing. Monitors may determine that a record is complete when an end message is detected for that particular call or transaction. Workstation 126 is connected to server 124 and may be directly connected to monitor 105–108. Workstation 126 provides network service providers or other users with access to retrieve data or to configure server 124 or monitors 119–122.

Server 124 is coupled to data storage device 127 and monitors 119–120 are coupled to memory 128. Memory units 127 and 128 may be used to store configuration and profile data for use by the monitoring system. Monitors 119–122 may use memory 128 to store call or transaction records or other Message Signaling Unit (MSU) data.

Network 10 illustrates a national communications network that may serve end offices 103, 104 in different locations within the same country. Calls that are routed to other countries must be routed through International Gateway (IGW) 129. International gateways provide access to communications networks in other countries, such as foreign network 130, which may be located in another country than network 10. The monitoring system described herein is capable of capturing call, transaction and other MSUs from the links connected to IGW 129.

In FIG. 1, monitor 131 is coupled to links 132 and 133 at IGW 129. Inter-monitor communications link 125 allows monitor 131 to communicate with monitors 119–122 and server 124 in order to exchange MSUs and other data. Any calls to foreign network 130, which originate in or pass through network 10, must traverse IGW 129 and links 132, 133. Monitor 131 is coupled to links 132 and 133, which allows the system to capture all of the MSU's that pass through IGW 129.

The monitoring system can determine the destination country for each call from the data in the MSUs captured at IGW 129. Statistics for international calls can be generated using data in the signaling units that are captured on links 132 and 133. Telephone numbers may differ in length in different countries, but the numbers in different countries follow the same general format. Individual subscribers are assigned a subscriber number (SN) which identifies a particular line for the subscriber. Subscriber numbers are comprised of an exchange code (EC) followed by a line number (LN). Countries may be divided up into several areas each of which is assigned a separate area code (AC). Calls between areas are dialed using the area code, exchange code and line number. Each country is assigned a unique country code (CC) which is used to place calls between countries. An international call is dialed using a country code, area code, exchange and line number (CC-AC-EC-LN). Country codes have been established by International Telegraph and Telephone Consultative Committee (CCITT) and may consist of one, two or three digits. Depending upon the country, the number of digits in the other parts of the telephone number may vary.

Signaling Connection Control Part (SCCP) user parts, such as Integrated Services Digital Network—User Part (ISUP) and Telephone User Part (TUP), have a Nature of Address field which indicates whether calls are national or international calls. For example, the Nature of Address may have a value of 3 for national numbers and a value of 4 for international numbers. Usually, outbound MSUs on link 132 will have a country code in the called party number field and an international call value in the Nature of Address field. The country code may designate country 134 or some other country that has a communications network linked to country 134. If a call is directed to a telephone in country 134, then IGW 129 may remove the country code from the called number and change the Nature of Address field to a national call value. If a call is directed to another country beyond country 134, then IGW 129 will typically pass MSUs to link 133 with the country code and Nature of Address fields unchanged.

Figure 2:
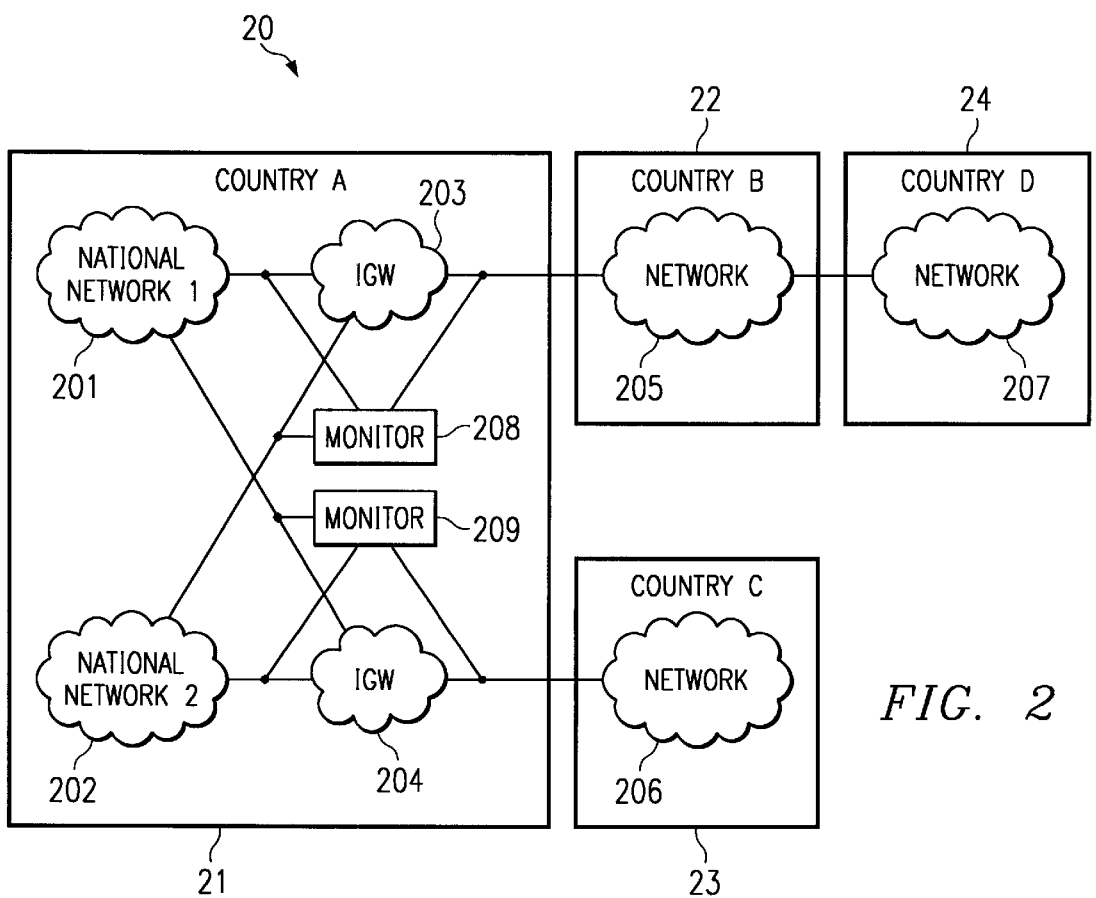
FIG. 2 is a block diagram illustrating links between international communications networks.

Turning now to FIG. 2, an international communications network, comprised of national networks 201–202 and 205–207, is shown. Communications between national networks 201 and 202, in country A 21, and networks 205–207, in countries B-D 22–24, must pass through international gateway 203 or 204. Monitor 208, which is connected to the links for IGW 203, captures all of the signaling units for calls between networks 201, 202 and networks 205, 207.

Monitor 208 has a number of processors for processing MSUs that are captured at IGW 129. MSUs passing through IGW 203 have an originating point code (OPC) for network 201 or 202 and a destination point code (DPC) for network 205. Monitor 208 can determine if a call is directed to network 205 or to network 207 by analyzing the country code field, Nature of Address field and DPC. The OPC in the MSUs of calls traversing IGW 129 identify whether the signaling units originate in network 201 or 202. Network monitors, such as monitor 208, generate statistics for international calls using this information.

Monitor 208 identifies whether the calls passing IGW 129 are directed to network 205 or to network 207. Calls directed to network 207 will have a country code for country D and an international Nature of Address value. Calls directed to network 205 may or may not have a country code. As discussed above, if the country codes for outbound calls at IGW 129 have been stripped, then the Nature of Address will be changed to a national call value. The monitoring system maintains a table that maps point codes to country codes. The table may be maintained on server 124 or on the individual monitors. Users can modify the table using workstation 126.

It will be understood that additional monitors, such as monitor 209, may be used to capture signaling units passing through other international gateways, such as IGW 204. Monitor 209 detects messages that are routed to network 206 in country C. The present invention can be used to compare the call success and failure rates for calls to different networks in different countries. For example, the quality of service can be measured and compared for one network, such as 201, with respect to calls routed to foreign networks 205–207. On the other hand the quality of service provided to countries B, C, and/or D can be compared between networks 201 and 202.

The monitoring system track historical statistics by determining whether each call is an international call or a national call, and whether the call is completed or fails. The statistics are stored to a memory device, such as memory 127 or 128. Users can recall statistical information and generate reports on the performance of networks 201 and 202. These statistics can be used to measure the quality of service that is provided by networks 201 and 202. Statistical reports can be configured to follow the specifications of the Telecommunication Standardization Sector of the International Telecommunication Union (ITU-T) Recommendation E.422, the disclosure of which is hereby incorporated by reference herein.

Table 1 is a list of the types of statistics that may be accumulated by the monitoring system disclosed herein.

TABLE 1

Total Outbound Calls by Country Code
Total Transit Calls by Country Code
Total Answer Messages (ANM) by Country Code
Total Answer Complete Messages (ACM) by Country Code
Total Reset Circuit Messages (RSC) by Country Code
Total Ring No Answer Messages (RNA) by Country Code
Average Hold Time by Country Code
Average Conversation Time by Country Code
Average Response Time by Country Code
Average Wait Time, Answered Calls by Country Code
Average Wait Time, Not Answered by Country Code Table 2 is a list of Release Cause statistics that may be accumulated by the present system ISUP messages.

TABLE 2

Busy Calls by Country Code
Circuit Congestion by Country Code
Call Fail by Country Code
Normal Release
Circuit Unavailable (CUA) by Country Code
Unallocated Number (UAN) by Country Code
Address Incomplete (ADI) by Country Code
Destination Out of Order (DOO) by Country Code Table 3 lists Backward Call Indicator statistics that may be accumulated using the system disclosed herein for TUP messages.

TABLE 3

Busy Calls by Country Code
Circuit Congestion (CGC) by Country Code
Call Fail (CFL) by Country Code
Clear Line Forward + Clear Line Backward (CLF + CLB)
Unallocated Number (UAN) by Country Code
Address Incomplete (ADI) by Country Code
Line Out of Service (LOS) by Country Code As illustrated in FIG. 2, monitor 208 will detect signaling units passing through IGW 129 whether the messages originate in network 201 or network 202. As a result, a network service provider for network 201 can use monitor 208 to determine the quality of service performance not only for calls originating from network 201, but also for calls originating from network 202.

Although the present invention and its advantages have been described in detail, it should be understood that various changes, substitutions and alterations can be made herein without departing from the spirit and scope of the invention as defined by the appended claims.

What is claimed is:

1. A method for measuring network quality for a remote national communications network, wherein a plurality of national networks in different countries are coupled to each other by communications links through one or more international gateways, the method comprising:

providing one or more monitoring units at each of said international gateways, the monitoring units coupled to the communications links at said international gateways, wherein said monitoring units are adapted to communicate with other monitoring units via an intermonitor network;

capturing, at a monitoring unit located at a local national network, messages passing between said national networks across said communications links;

correlating associated ones of said captured messages into message records;

analyzing said message records to identify calls or transactions or both that were routed across said remote national network; and generating network performance statistics for said remote national network using said message records.

2. The method of claim 1 wherein said generating step further comprises:

determining an origination network and a destination network for said messages; and determining a call completion status for calls related to said messages.

3. The method of claim 1 wherein said message records are call records wherein said associated ones of said captured messages relate to one call.

4. The method of claim 1 wherein said message records are transaction records wherein said associated ones of said captured messages relate to one transaction.

5. The method of claim 1 further comprising:

comparing statistics for two or more originating national networks.

6. The method of claim 1 wherein said network performance statistics comprise statistics selected from the group consisting of:

a number of outbound calls;
a number of transit calls;
a number of answered calls; and
a number of ring, no answer calls.

7. The method of claim 1 wherein said network performance statistics comprise statistics selected from the group consisting of:

an average hold time;
an average conversation time;
an average response time;
an average wait time for answered calls; and
an average wait time for not answered calls.

8. The method of claim 1 wherein said network performance statistics comprise statistics selected from the group consisting of:

a number of busy calls;
a number of circuit congestion calls;
a number of call fail calls;
a number of normal release calls;
a number of circuit unavailable calls;
a number of unallocated number calls;
a number of address incomplete calls; and
a number of destination out of order calls.

9. A system for measuring network quality for a remote national communications network, wherein a plurality of national networks in different countries are coupled to each other by communications links through one or more international gateways, the system comprising:

one or more monitoring units at each of said international gateways, the monitoring units coupled to the communications links at said international gateways, wherein said monitoring units are adapted to communicate with other monitoring units via an intermonitor network, wherein at least one of said monitoring units is located at a local national network, the monitoring units comprising:

means for capturing messages passing between said national networks across said communications links; and means for correlating associated ones of said captured messages into message records;

the system further comprising:

means for analyzing said message records to identify calls or transactions or both that were routed across said remote national network; and means for generating network performance statistics for said remote national network using said message records.

10. The system of claim 9 wherein said means for generating further comprises:

means for determining an origination network and a destination network for said messages; and means for determining a call completion status for calls related to said messages.

11. The system of claim 9 wherein said message records are call records wherein said associated ones of said captured messages relate to one call.

12. The system of claim 9 wherein said message records are transaction records wherein said associated ones of said captured messages relate to one transaction.

13. The system of claim 9 further comprising:

comparing statistics for two or more originating national networks.

14. The system of claim 9 wherein said network performance statistics comprise statistics selected from the group consisting of:

a number of outbound calls;
a number of transit calls;
a number of answered calls; and
a number of ring, no answer calls.

15. The system of claim 9 wherein said network performance statistics comprise statistics selected from the group consisting of:

an average hold time;
an average conversation time;
an average response time;
an average wait time for answered calls; and
an average wait time for not answered calls.

16. The system of claim 9 wherein said network performance statistics comprise statistics selected from the group consisting of:
   a number of busy calls;
   a number of circuit congestion calls;
   a number of call fail calls;
   a number of normal release calls;
   a number of circuit unavailable calls;
   a number of unallocated number calls;
   a number of address incomplete calls; and
   a number of destination out of order calls.

* * * * *